US010108752B2

(12) United States Patent
Maisonneuve

(10) Patent No.: US 10,108,752 B2
(45) Date of Patent: Oct. 23, 2018

(54) ENGRAVING A 2D IMAGE ON A SUBDIVISION SURFACE

(71) Applicant: DASSAULT SYSTEMES, Velizy Villacoublay (FR)

(72) Inventor: Richard Maisonneuve, Aix en Provence (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 230 days.

(21) Appl. No.: 15/013,775

(22) Filed: Feb. 2, 2016

(65) Prior Publication Data

US 2016/0224693 A1 Aug. 4, 2016

(30) Foreign Application Priority Data

Feb. 2, 2015 (EP) .................................... 15305153

(51) Int. Cl.
*G06F 17/50* (2006.01)
*G06T 19/20* (2011.01)
(Continued)

(52) U.S. Cl.
CPC .............. *G06F 17/50* (2013.01); *G06T 17/20* (2013.01); *G06T 17/30* (2013.01); *G06T 19/20* (2013.01); *G06T 2219/2021* (2013.01)

(58) Field of Classification Search
USPC ............ 703/2, 6, 22; 345/419, 420; 382/154
See application file for complete search history.

(56) References Cited

U.S. PATENT DOCUMENTS 4,797,842 A 1/1989 Nackman et al.
6,037,949 A 3/2000 Derose et al.
(Continued)

FOREIGN PATENT DOCUMENTS

EP 1 750 229 A2 2/2007
EP 1 881 457 A1 1/2008
(Continued)

OTHER PUBLICATIONS

Extended European Search Report dated Jul. 8, 2015 in Application No. 15305153.7.
(Continued)

*Primary Examiner* — Thai Phan
(74) *Attorney, Agent, or Firm* — Oblon, McClelland, Maier & Neustadt, L.L.P.

(57) ABSTRACT

It is the method comprising the steps of defining, by a user, a base mesh associated to a subdivision surface and to a corresponding predetermined mesh-to-NURBS-surface conversion algorithm, the subdivision surface representing the 3D modeled object; defining, by the user, a 2D image and a location for engraving the 2D image on the subdivision surface; and determining a NURBS surface that corresponds to applying a deformation map on the result of performing the mesh-to-NURBS-surface conversion algorithm to the base mesh, the deformation map including displacement vectors provided for positions of the result of performing the mesh-to-NURBS-surface conversion algorithm to the base mesh, the positions corresponding to the location for engraving the 2D image, the displacement vectors being computed based on corresponding pixel values of the 2D image. Such a method improves the design of a 3D modeled object.

9 Claims, 11 Drawing Sheets

(51) Int. Cl.
*G06T 17/20* (2006.01)
*G06T 17/30* (2006.01)

(56) References Cited

U.S. PATENT DOCUMENTS

| | | | |
|---|---|---|---|
| 6,256,038 | B1 | 7/2001 | Krishnamurthy |
| 6,271,856 | B1 | 8/2001 | Krishnamurthy |
| 6,389,154 | B1 | 5/2002 | Stam |
| 6,476,804 | B1 * | 11/2002 | Costabel ............... G06T 13/20 345/419 |
| 6,553,337 | B1 | 4/2003 | Lounsbery |
| 6,587,105 | B1 | 7/2003 | Stam |
| 6,603,473 | B1 | 8/2003 | Litke et al. |
| 6,636,853 | B1 | 10/2003 | Stephens, Jr. |
| 6,639,592 | B1 | 10/2003 | Dayanand et al. |
| 6,738,062 | B1 | 5/2004 | Moreton |
| 6,760,022 | B1 | 7/2004 | Anderson |
| 6,806,874 | B2 | 10/2004 | Biermann et al. |
| 6,920,419 | B2 | 7/2005 | Kitamura et al. |
| 6,950,099 | B2 | 9/2005 | Stollnitz et al. |
| 7,023,435 | B1 | 4/2006 | Litke et al. |
| 7,170,516 | B2 | 1/2007 | Stollnitz et al. |
| 7,200,532 | B1 | 4/2007 | Cheng |
| 7,251,777 | B1 | 7/2007 | Valtchev et al. |
| 7,369,972 | B2 | 5/2008 | Boier-Martin et al. |
| 7,400,323 | B2 | 7/2008 | Nigro |
| 7,417,635 | B2 | 8/2008 | Rockwood et al. |
| 7,423,641 | B2 | 9/2008 | Borac |
| 7,595,799 | B2 | 9/2009 | Nigro |
| 7,636,091 | B2 | 12/2009 | Rockwood et al. |
| 7,710,415 | B2 * | 5/2010 | Jennings, Jr. ........... G06T 19/20 345/419 |
| 7,893,937 | B2 | 2/2011 | Rosel et al. |
| 7,944,443 | B1 * | 5/2011 | Milliron ................. G06T 17/30 345/419 |
| 7,952,575 | B2 | 5/2011 | Rosel |
| 8,269,770 | B1 | 9/2012 | Carr et al. |
| 8,279,239 | B1 * | 10/2012 | Jensen ................... G06T 19/20 345/647 |
| 8,471,852 | B1 | 6/2013 | Bunnell |
| 8,970,628 | B1 * | 3/2015 | Jensen ................... G06T 19/20 345/419 |
| 9,036,898 | B1 * | 5/2015 | Beeler .................... G06T 19/20 382/154 |
| 9,189,886 | B2 * | 11/2015 | Black ................ G06K 9/00369 |
| 2002/0152222 | A1 | 10/2002 | Holbrook |
| 2003/0020710 | A1 | 1/2003 | Biermann et al. |
| 2003/0218609 | A1 | 11/2003 | Maillot et al. |
| 2004/0085311 | A1 | 5/2004 | Lee et al. |
| 2004/0189633 | A1 | 9/2004 | Sederberg |
| 2006/0017723 | A1 | 1/2006 | Baran et al. |
| 2006/0109269 | A1 * | 5/2006 | Jennings, Jr. ........... G06T 19/20 345/424 |
| 2007/0030267 | A1 | 2/2007 | Nigro |
| 2007/0030268 | A1 | 2/2007 | Nigro |
| 2007/0176923 | A1 | 8/2007 | Lee et al. |
| 2008/0024499 | A1 | 1/2008 | Bateman |
| 2008/0036755 | A1 | 2/2008 | Bae et al. |
| 2008/0225043 | A1 | 9/2008 | Rosel |
| 2008/0246767 | A1 | 10/2008 | Shen et al. |
| 2009/0027396 | A1 | 1/2009 | Frisken |
| 2009/0102833 | A1 | 4/2009 | Boier-Martin et al. |
| 2009/0128556 | A1 | 5/2009 | Fischer et al. |
| 2009/0201295 | A1 | 8/2009 | Kripac et al. |
| 2012/0206457 | A1 | 8/2012 | Crocker |
| 2013/0120383 | A1 | 5/2013 | Joshi et al. |
| 2013/0124149 | A1 | 5/2013 | Carr et al. |
| 2013/0271459 | A1 | 10/2013 | Gary |
| 2014/0267268 | A1 | 9/2014 | Tipton |
| 2016/0140750 | A1 * | 5/2016 | Pai ......................... G06T 13/20 345/420 |

FOREIGN PATENT DOCUMENTS

| | | |
|---|---|---|
| EP | 1 881 458 A1 | 1/2008 |
| EP | 1 883 020 A1 | 1/2008 |
| JP | 2001-067491 A | 3/2001 |
| WO | 01/08102 A1 | 2/2001 |
| WO | 03/098477 A1 | 11/2003 |
| WO | 2004/088468 A2 | 10/2004 |

OTHER PUBLICATIONS

Tony DeRose, Michael Kass, Tien Truong, "Subdivision Surfaces in Character Animation," Jul. 1998, Proceedings of the 25th Annual Conference on Computer Graphics and Interactive Techniques, p. 85-94.

Ying, L., et al., "Nonmanifold Subdivision," Proceedings of the Conference Visualization '01, San Diego, California, pp. 325-331, 359 (2001).

Biermann, H., et al., "Sharp Features on Multiresolution Subdivision Surfaces," Computer Graphics and Applications, Proceedings. Ninth Pacific Conference, IEEE: 140-149 (2001).

Havemann et al. "A versatile 30 Model Representation for Cultural Reconstruction". Published 2001.

Havemann et al. "Progressive Combined BReps-Multi-Resolution Meshes for Incremental Real-Time Shape Manipulation". Pub. 2003.

Bolz et al. "Rapid Evaluation of Catmuli-Clark Subdivision Surfaces", published 2002.

Boier-Martin et al. "Differentiable Parameterization of Catmull-Clark Subdivision Surfaces". Published 2004.

Cotrina-Navau, J., et al., "A Generic Approach to Free Form Surface Generation," Proceedings of the Seventh ACM Symposium on Solid Modeling and Applications, section 7.2:35-44 (2002).

Zorin D. et al.: "Interpolating Subdivision for Meshes with Arbitrary Topology", Computer Graphics Proceedings 1996 (Siggraph), New Orleans, Aug. 4-9, 1996; Graphics Proceedings (Siggraph), New York, NY ACM, US, Aug. 4, 1996 (Aug. 4, 1996), pp. 189-192, XP000682735.

Mandal C. et al.: "A Novel Fem-based Dynamic Framework for Subdivision Surfaces", Computer Aided Design, Elsevier Publishers Bv., Barking, GB, vol. 32, No. 8-9, Aug. 1, 2000 (2000-OS-01), pp. 479-497, XP004203522 ISSN: 0010-4485.

Loop C.: "Second Order Smoothness Over Extraordinary Vertices", Eurographics Symposium on Geometry Processing, Eurographics Association, U.S., vol. 71, Jan. 1, 2004 (Jan. 1, 2004), pp. 165-174, XP007901487.

Prautzsch H. et al: "A Gel> and a Gc2> Subdivision Scheme for Triangular Nets", International Journal of Shape Modeling, World Scientific, Singapore, 5G, vol. 6, No. 1, Jun. 1, 2000 (Jun. 1, 2000), pp. 21-35, XP007910137 ISSN: 0218-6543.

Peters J.: "Cc2> Free-form Surfaces of Degree (3,5)", Computer Aided Geometric Design, North-Holland, vol. 19, No. 2, Feb. 1, 2002 (Feb. 1, 2002), pp. 113-126, XP007910102 ISSN:0167-8396.

Zorin D., "Classical subdivision surfaces II", Lecture No. 15 of course CS448 Topics in Computer Graphics Mathematical Methods for Computer Graphics, Dec. 1997, Stanford University (retrieved at http://graphics.stanford.edu/courses/cs44897fall/notes/lect15.ps).

Catmull E. and Clark J.: "Recursively generated B-spline surfaces on arbitrary topological meshes", Computer-Aided Design, 10:350-355, Jul. 1978.

J. Stam: "Exact Evaluation of Catmull-Clark Subdivision Surfaces At Arbitrary Parameter Values", Proceedings of SIGGRAPH 1998, pp. 395-404, Jul. 1998.

Jorg Peters: "Patching Catmull-Clark Meshes", University of Florida.

Henning Biennanny, Joana Martin, Fausto Bernardini, and Denis Zorin: "Cut-and-Paste Editing of Multi-resolution Surfaces", Proceedings of ACM SIGGRAPH 2002, vol. 21 Issue 3, Jul. 2002, pp. 312-321.

Won-Seek Lee, In-Ho Song and Sung-Chong Chung: "3D Reconstruction for the 3D engraving system from 2D images", ASPE Proceedings, Oct. 19-Oct. 24, 2008, Portland, Oregon.

(56) References Cited

OTHER PUBLICATIONS

Rick Leung, Stephen Mann : "Distortion Minimization and Continuity Preservation in Surface Pasting", Graphics Interface, p. 193-200, 2003.
Steven W. Smith : "The Scientist and Engineer's Guide to Digital Signal Processing".
D. Terzopoulos, H. Qin: "Dynamic NURBS with Geometric Constraints for Interactive Sculpting", ACM Transactions on Graphics, 13(2), Apr. 1994, 103-136.
S.M. Hu, Y.F. Li, T. Ju, X. Zhu : "Modifying the shape of NURBS surfaces with geometric constraints", Computer Aided Design, 33 (2001) 903-912.
Hermann, T. et al., "Geometrical Criteria on the Higher Order Smoothness of Composite Surfaces", Computer Aided Geometric Design, vol. 16, No. 9, pp. 907-911, Oct. 1999.
Hughes, H., et al. "Piecewise Smooth Surface Reconstruction" SIGGRAPH 94 Conference Proceedings, pp. 295-302; Jul. 24, 1998.
Pernot, J-P, et al. "A Shape Deformation Tool to Model Character Lines in Early Design Phases" Proceedings SMI, Shape Modeling International, IEEE Computer Soc. , pp. 165-276; 2002.
Office Action dated Aug. 2, 2016 in European Application No. 06291190.4.
Krishnamurthy, V., et al., "Fitting Smooth Surfaces to Dense Polygon Meshes" Computer Science Department, Stanford University, XP-002388348, pp. 1-12.

\* cited by examiner

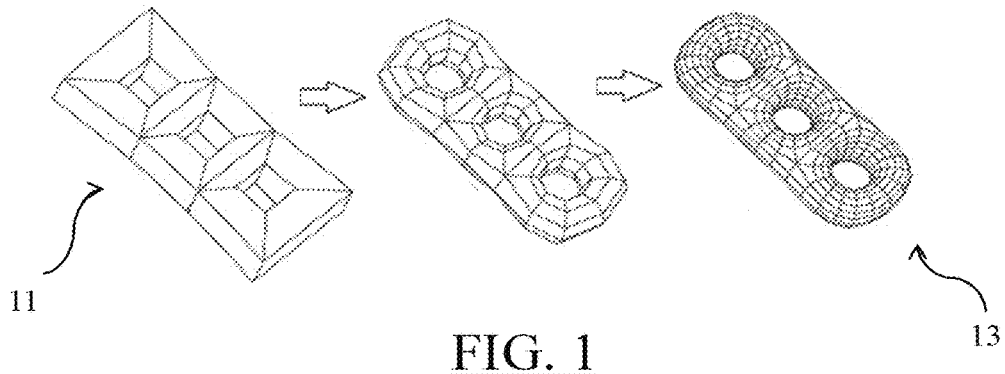
11  FIG. 1  13
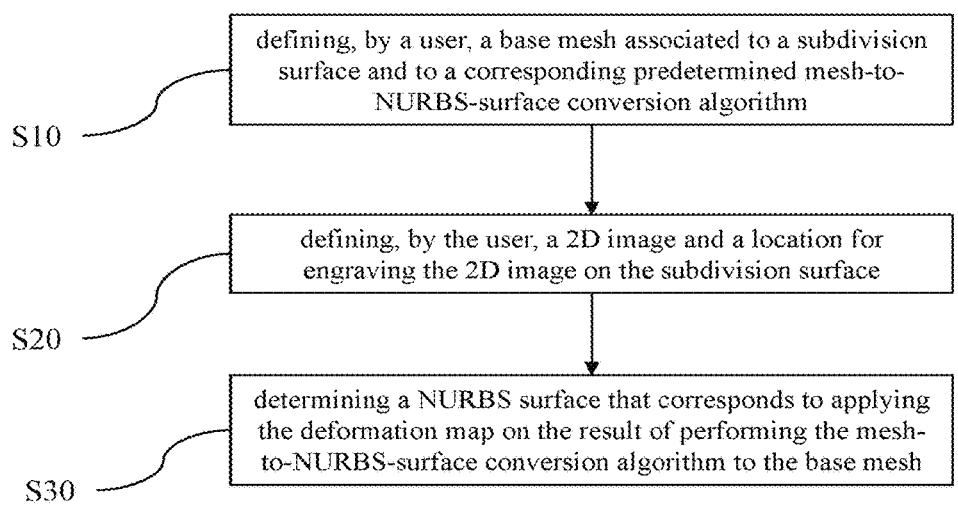
FIG. 2

$B_0$ $S_0 = PCCM(B_0)$

ENGRAVING A 2D IMAGE ON A SUBDIVISION SURFACE

CROSS-REFERENCE TO RELATED APPLICATIONS

This application claims priority under 35 U.S.C. § 119 or 365 to European Application No. 15305153.7, filed Feb. 2, 2015. The entire teachings of the above application(s) are incorporated herein by reference.

FIELD OF THE INVENTION

The invention notably relates to the field of computer-aided design (CAD), and more particularly to a method, program and system for designing a 3D modeled object by graphical user-interaction, with a data processing based on a 2D image.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise.

The PLM solutions provided by DASSAULT SYSTEMES (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

CAD solutions make extensive use of two main widely known technologies for surface modeling: Non Uniform Rational B-Spline surfaces (NURBS in the following) and Subdivision surfaces.

NURBS technology is based on a polynomial or rational parameterization handled by rectangular grids of 3D points, named the "control points". Edition of a NURBS surface is performed by moving control points. The technology is designed in such a way that the degree of polynomials does not depend on the number of control points. Furthermore, the influence of control points is restricted to a neighborhood. Consequently, the user is able to locally modify the shape of the surface, the region outside of the said neighborhood being untouched. A classical reference in this field is textbook *The NURBS book*, L. Piegl and T. Wayne, Springer, $2^{nd}$ edition, 2013.

On the other hand, a subdivision surface is defined by a 3-dimensional "base mesh" made of points and line segments. The base mesh is user-defined, and may feature an arbitrary topology, as opposed to the rectangular grid of NURBS' control points. The base mesh governs the overall shape of the subdivision surface and can be edited by the user. A change in the base mesh affects the whole subdivision surface. As opposed to NURBS surfaces, the subdivision surface is a limit object of a subdivision process starting with the base mesh. FIG. 1 illustrates a three holes closed base mesh 11 and the first subdivision steps. The limit surface is a smooth three holes-torus like object 13. The fundamentals are explained notably in the following reference: *Recursively generated B-Spline surfaces on arbitrary topological meshes*, E. Catmull, J. Clark, Computer Aided Design, Vol. 10, No 6, November 1978. It is noted that it is possible to approximate a subdivision surface by an arrangement of NURBS surfaces, with a conversion of the base mesh into a NURBS surface, as explained in documents U.S. Pat. No. 7,595,799 B2 (corresponding to EP 1750229 B1) and U.S. Pat. No. 7,400,323 B2.

In short, NURBS technology features a local modification capability and a grid-defined topology and Subdivision technology features an arbitrary topology and a non-local edition capability. Clearly, creation of small details on a surface while saving its overall shape is well supported by the NURBS technology because of its ability to handle local modification. Conversely, this capability is not supported by Subdivision surface technology. On the other hand, arbitrary topology is supported by subdivision surface technology as opposed to NURBS surface, the topology of which being restricted to a rectangular grid of control points.

What is missing in the prior art is notably the capability of a local change on a surface with arbitrary topology. Within this context, there is still a need for an improved solution to design a 3D modeled object.

SUMMARY OF THE INVENTION

It is therefore provided a computer-implemented method for designing a 3D modeled object. The method comprises the step of defining, by a user, a base mesh associated to a subdivision surface and to a corresponding predetermined mesh-to-NURBS-surface conversion algorithm. The subdivision surface represents the 3D modeled object. The method also comprises the step of defining, by the user, a 2D image and a location for engraving the 2D image on the subdivision surface. The method also comprises the step of determining a NURBS surface that corresponds to applying a deformation map on the result of performing the mesh-to-NURBS-surface conversion algorithm to the base mesh. The deformation map includes displacement vectors provided for positions of the result of performing the mesh-to-NURBS-surface conversion algorithm to the base mesh. The positions correspond to the location for engraving the 2D image. The displacement vectors are computed based on corresponding pixel values of the 2D image.

The method may comprise one or more of the following:
  the method comprises computing the displacement vectors, including determining, from the base mesh, a first 3D mesh that corresponds to the location for engraving the 2D image, determining, from the first 3D mesh, a second 3D mesh by displacing vertices of the first 3D mesh, in a direction normal to the first 3D mesh, based on the corresponding pixel values of the 2D image, and computing, for positions of the result of performing the mesh-to-NURBS-surface conversion algorithm to the base mesh, a displacement vector equal to the 3D position difference between the corresponding control point of the result of performing the mesh-to-NURBS-surface conversion algorithm to the second 3D mesh and the corresponding control point of the result of performing the mesh-to-NURBS-surface conversion algorithm to the first 3D mesh;

determining the first 3D mesh includes extracting a sub-mesh of the base mesh that corresponds to the location for engraving the 2D image, and then subdividing the sub-mesh a predetermined number of times;

the predetermined number of times is defined by the user and/or increasingly depends on a predetermined criterion associated to a level of details of the 2D image;

the corresponding pixel values of the 2D image are pixel grayscale values;

the amplitude of a displacement vector increasingly depends on the corresponding grayscale value; and/or the user further selects an engraving direction from a predetermined binary list.

It is further provided a 3D modeled object designed by the method.

It is further provided a computer file including specifications of the 3D modeled object.

It is further provided a computer program comprising instructions for performing the method.

It is further provided a computer readable data storage medium having recorded thereon the computer program.

It is further provided a CAD system comprising a processor coupled to a memory and a graphical user interface, the memory having recorded thereon the computer program.

It is further provided a method for manufacturing an industrial product, comprising the steps of designing a three-dimensional object that represents the industrial product according to the above design method, and then manufacturing the industrial product based on the designed three-dimensional object.

BRIEF DESCRIPTION OF THE DRAWINGS

Embodiments of the invention will now be described, by way of non-limiting example, and in reference to the accompanying drawings, where:

FIG. 1 shows a subdivision surface;
FIG. 2 flowchart of an example of the method.

DETAILED DESCRIPTION OF THE INVENTION

Figure 3:
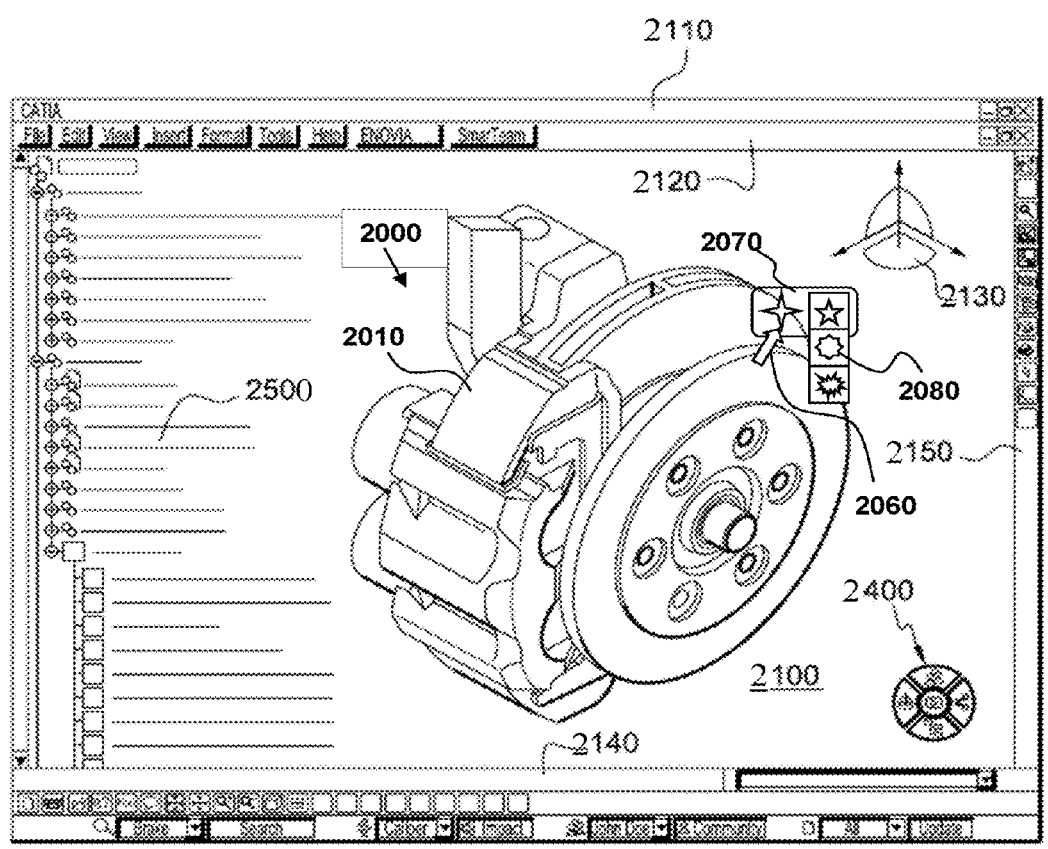
FIG. 3 shows an example of a graphical user interface of the system.

With reference to the flowchart of FIG. 2, it is proposed a computer-implemented method for designing a 3D modeled object. The method comprises a step of defining S10, by a user, a base mesh associated to a subdivision surface and to a corresponding predetermined mesh-to-NURBS-surface conversion algorithm. The subdivision surface represents the 3D modeled object. The method also comprises defining S20, by the user, a 2D image and a location for engraving the 2D image on the subdivision surface. And the method then comprises determining S30 a NURBS surface that corresponds (i.e. by "corresponds", it is meant that the specific way to obtain the NURBS surface is an implementation detail, as long as the result would be obtained—at least approximately, e.g. in the meaning of "approximation" pro-vided later—by the following steps, even if those specific steps are not implemented) to applying a deformation map on the result of performing the mesh-to-NURBS-surface conversion algorithm to the base mesh. The deformation map includes displacement vectors provided for positions of the result of performing the mesh-to-NURBS-surface conversion algorithm to the base mesh. These positions correspond to the location for engraving the 2D image. The displacement vectors are computed based on corresponding pixel values of the 2D image. Such a method improves the design of a 3D modeled object.

Notably, the method allows the design modification of a 3D modeled object in the context of a base mesh associated to a subdivision surface and to a corresponding predetermined mesh-to-NURBS-surface conversion algorithm, with the advantages of such a design context well-known from the field of CAD. Indeed, the structure of the base mesh and the associated user-intent regarding the design of the surface are kept throughout the method, which simply amounts to adding a specification to this base mesh framework to which CAD designers are used. Unlike prior art modification solutions performed on the base mesh (e.g. the addition of multi-resolution information and/or the addition of details after subdivisions), the method does not contemplate a subdivision of the base mesh before its later conversion (with the predetermined mesh-to-NURBS-surface conversion algorithm at S30), such that said later conversion may be performed easily (in terms of computational costs) and will not result in a prohibitive number of control points. In other words, the number of faces of the mesh to be later inputted to the conversion algorithm is not unduly increased by the method. Unlike prior art modifications solutions performed on a NURBS, the method allows the modification of a model provided as a base mesh of a subdivision surface, such that the user may later perform other modifications, in a relatively simplified way, thanks to this context (with advantages related to the arbitrary topology possible in this framework, and to the little memory space taken by a base mesh relative to a complex NURBS). Indeed, as widely known in the field of CAD, styling design is rather performed on subdivision surfaces than on NURBS for these reasons. The user may thus perform base mesh editions of the 3D modeled object even after the addition of the specification defined at S20. Also, the method ensures that continuity between NURBS patches is not unduly broken, as the defining S20 is performed at the base mesh level.

The method thus offers to the user an easy, interactive and visual way to add a local detail on a 3D modeled object, by defining a specification at S20 in the form of a 2D image provided with a location on the subdivision surface. This edition simulates a real engraving, and it respects the industrial requirements of the user, which include keeping the context of a design based on the surface subdivision technology (with a base mesh), where, in addition, continuity of the final surface matters.

The method is computer-implemented. Steps of the method are indeed executed on a computer system, by the computer system alone or by graphical user-interaction (i.e. a user interacting with a GUI of the computer system). Thus, steps performed specifically by the computer system may be performed fully automatically. In examples, the triggering of at least some of the steps of the method may be performed through user-computer interaction. Notably, the defining steps S10 and S20 are performed by the user, working on the computer, in the same work session or in different work sessions. The determining S30 may be triggered by the user, in the same work session (the one of both S10 and S20 or the one of S20 only) or in a different work session. The level of user-computer interaction required may depend on the level of automatism foreseen and put in balance with the need to implement the user's wishes. In examples, this level may be user-defined and/or pre-defined.

A typical example of computer-implementation of the method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

The method generally manipulates modeled objects. A modeled object is any object defined by data stored in the database. By extension, the expression "modeled object" designates the data itself "Designing a 3D modeled object" designates any action or series of actions which is at least part of a process of elaborating a 3D modeled object. Thus, the method may comprise creating the 3D modeled object from scratch. Alternatively, the method may comprise providing a 3D modeled object previously created, and then modifying the 3D modeled object, notably by the engraving achieved by the method.

According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

By CAD system, it is meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD system, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing or modeling process. The 3D modeled object further has the particularity of being not only defined by the base mesh of S10, but also by the data defined at S20 which form an additional specification to those of traditional 3D modeled objects.

The 3D modeled object may represent the geometry of a product to be manufactured in the real world subsequent to the completion of its virtual design with for instance a CAD software solution or CAD system, such as a (e.g. mechanical) part or assembly of parts, or more generally any rigid body assembly (e.g. a mobile mechanism). A CAD software solution allows the design of products in various and unlimited industrial fields, including: aerospace, architecture, construction, consumer goods, high-tech devices, industrial equipment, transportation, marine, and/or offshore or transportation. The 3D modeled object designed by the method thus represents an industrial product which may be a part of a terrestrial vehicle (including e.g. car and light truck equipment, racing cars, motorcycles, truck and motor equipment, trucks and buses, trains), a part of an air vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging). The method is particularly useful where aesthetic aspects of the 3D modeled object are of high importance. This is true when the 3D modeled object represent a vehicle or a plane mechanical part, such as visible part, or a consumer good (e.g. an electronic good, such as a camera).

By PLM system, it is meant any system adapted for the management of a modeled object representing a physical manufactured product. In a PLM system, a modeled object is thus defined by data suitable for the manufacturing of a physical object. These may typically be dimension values and/or tolerance values. For a correct manufacturing of an object, it is indeed better to have such values.

CAM stands for Computer-Aided Manufacturing. By CAM solution, it is meant any solution, software of hardware, adapted for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus allowing decision on management or required investment. CAM is a subsequent process after a CAD process and potential CAE process. Such CAM solutions are provided by Dassault Systemes under the trademark DELMIA®.

CAE stands for Computer-Aided Engineering. By CAE solution, it is meant any solution, software or hardware, adapted for the analysis of the physical behavior of a modeled object. A well-known and widely used CAE technique is the Finite Element Method (FEM) which typically involves a division of a modeled objet into elements which physical behaviors can be computed and simulated through equations. Such CAE solutions are provided by Dassault Systemes under the trademark SIMULIA®. Another growing CAE technique involves the modeling and analysis of complex systems composed a plurality components from different fields of physics without CAD geometry data. CAE solutions allows the simulation and thus the optimization, the improvement and the validation of products to manufacture. Such CAE solutions are provided by Dassault Systemes under the trademark DYMOLA®.

PDM stands for Product Data Management. By PDM solution, it is meant any solution, software or hardware, adapted for managing all types of data related to a particular product. A PDM solution may be used by all actors involved in the lifecycle of a product: primarily engineers but also project managers, finance people, sales people and buyers. A PDM solution is generally based on a product-oriented database. It allows the users to share consistent data on their products and therefore prevents actors from using divergent data. Such PDM solutions are provided by Dassault Systemes under the trademark ENOVIA®.

FIG. 3 shows an example of the GUI of the system, wherein the system is a CAD system.

The GUI 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art. Some of these icons are associated with software tools, adapted for editing and/or working on the 3D modeled object 2000 displayed in the GUI 2100, displayed 3D modeled object 2000 being for example the result of performing the method. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. change the dimension, color, etc.) or edit geometrical constraints by selecting an appropriate icon. For example, typical CAD operations are the modeling of the punching or the folding of the 3D modeled object displayed on the screen. The GUI may for example display data 2500 related to the displayed product 2000. In the example of FIG. 2, the data 2500, displayed as a "feature tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

Figure 4:
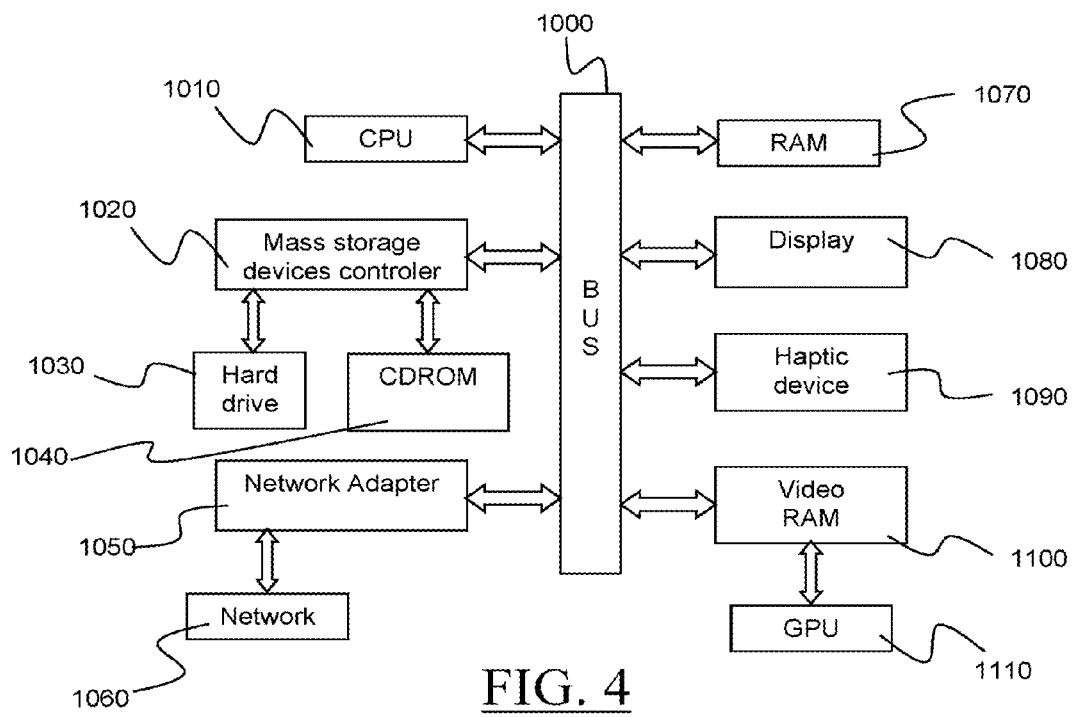
FIG. 4 shows an example of the system.

FIG. 4 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive/touch pad, and/or a sensitive/touch screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The defining S10 is now discussed.

As widely known from the field of CAD, a user may often define (i.e. design) a mesh, called "base mesh" associated to a subdivision surface. This is what is done at S10 in the method. A mesh designates any graph structure, with vertices (3D positions) and edges (e.g. segments) linking vertices two-by-two and forming so-called faces of the mesh (i.e. smallest cycles of edges). The mesh may be one of different types, including quad meshes (consisting mainly or fully of four edge faces) and triangular meshes (consisting mainly or fully of three edge faces). The defining S10 may be performed in any way, including quick reproductions according to symmetry operations as in U.S. Pat. No. 7,893,937 B2.

A base mesh in CAD is associated to a subdivision surface and to a corresponding predetermined mesh-to-surface conversion algorithm. Indeed, the base mesh is the underlying mesh in the data defining the geometry of the 3D modeled object. In other words, the geometry of the object is represented by the mesh. More specifically and as widely known, the base mesh is conceptually associated to a subdivision algorithm. Subdividing infinitely the base mesh according to said subdivision algorithm would result in a surface, called "subdivision surface", that represents the envelope/boundary of the designed 3D modeled object and thereby models the 3D modeled object. It is thus said that the base mesh "controls" the subdivision surface. The subdivision algorithm may be any known subdivision algorithm, such as the Catmull-Clark subdivision algorithm in the case of a quad mesh, or the Loop subdivision algorithm in the case of a triangular mesh.

As widely known, for the purpose of practicability, the subdivision surface is actually not determined by the system. Instead, the system determines an approximation thereof under the form of a set of parametric patches, typically NURBS (e.g. Bézier) surface patches. For example, the system stores a program for performing a scheme that converts the mesh into a set of parametric patches that approximates the subdivision surface. In this sense, the scheme corresponds to the underlying subdivision algorithm. In the context of the method, this all means that the method is run on a system that supports subdivision surface technology, being notably configured/adapted for a user to define a base mesh (such as at S10) and to automatically output/compute/determine a surface that approximates the real and theoretical subdivision surface, according to a predetermined subdivision scheme (e.g. Catmull-Clark for a quad mesh or Loop for a triangular mesh), based on a predetermined conversion algorithm, for example for display/editions/simulations or any other processing of the surface known in CAD. By "approximation", it is meant that the scalar volume defined (integral of a positive scalar function) between the theoretical subdivision surface and the output of the mesh-to-surface conversion algorithm is less than 10% or 5% of the volume of the smallest parallelepiped bounding box enveloping the subdivision surface.

In the case of the method, the conversion algorithm predetermined to the system is a mesh-to-NURBS-surface conversion algorithm, meaning that the base mesh is transformed in a set of NURBS elementary surfaces/patches that approximate the subdivision surface associated to the base mesh (the base mesh being a quad mesh and the subdivision scheme the Catmull-Clark subdivision scheme, in an example extensively illustrated later). The predetermined mesh-to-NURBS-surface conversion algorithm may be called "approximation operator" and it may be noted PCCM (•). The conversion/transformation of a base mesh $B_0$ is written $S_0=PCCM(B_0)$ in the following. In an example, operator PCCM(•) is the mesh-to-NURBS-surface conversion algorithm described in documents U.S. Pat. No. 7,595,799 B2 (corresponding to EP 1750229 B1) and U.S. Pat. No. 7,400,323 B2 (where U.S. Pat. No. 7,595,799 B2 describes how to generate NURBS patches and U.S. Pat. No. 7,400,323 B2 how to improve quality of the geometrical connections between the patches), which are incorporated herein by reference, in the configuration where it achieves a $C^2$ continuity everywhere (i.e. between all pairs of NURBS patches) except in the neighborhood of extraordinary vertices where it achieves at least $C^0$. But the predetermined mesh-to-NURBS-surface conversion algorithm may be any other known operator producing untrimmed patches with $C^2$ continuity between each other except in the neighborhood of extraordinary vertices where they are at least $C^0$ (Catmull-Clark subdivision convergence property, see *Recursively generated B-spline surfaces on arbitrary topological meshes*, E. Catmull, J. Clark, Computer-Aided Design Volume 10, Issue 6, November 1978, Pages 350-355). For the sake of completeness, it is noted, as known, that such operators perform an initial number of subdivisions in order to have a homogenous mesh (usually two), and then create NURBS patches according to an equation solving, the complexity of the operation being increasingly depending on the number of inputted mesh faces. Thereby, such operators are incompatible with multi-resolution meshes (meshes with local information to modify the predetermined subdivision scheme—so as to add local details), at least when the multi-resolution setting consists in adding information beyond the second or third level of subdivision.

As a reminder, a vertex is said to be regular (other vertices being on the contrary said to be extraordinary) if they satisfy one of the two following conditions:
  The vertex does not lie on a free border of the mesh, and it is surrounded by four non-sharp edges (and thus surrounded by four faces).
  The vertex lies on a free border of the mesh, and it is surrounded by two free edges and one non-free and non-sharp edge (thus surrounded by two faces).

This definition may also be found in the literature, notably in U.S. Pat. No. 7,595,799 B2 (corresponding to EP 1750229 B1) and U.S. Pat. No. 7,400,323 B2. Regular vertices ensure the best surface quality in Catmull-Clark subdivision theory.

As known per se, a NURBS surface is defined by a (2D) grid of so-called "control points", with the usual topological definition of "grid", e.g. with several (at least two) rows and several (at least two) columns. Throughout the method, the computer system determines S20, a grid of surface points that belong to the NURBS surface and that corresponds to the grid of control points according to the predetermined invertible function. The surface points are points geometrically lying on/belonging to the surface. In the case of a NURBS, a straightforward grid of surface is the grid of Gréville points of the example. The predetermined invertible function that allows the one-to-one correspondence between surface Gréville points and control points (generally outside the surface itself) of a NURBS is predetermined and provided from the widely known mathematics describing NURBS geometry. These mathematics are however detailed hereunder for the sake of completeness. It is noted that the determining S20 may be performed in any way, e.g. as a background process that re-computes real-time the Gréville points each time the surface and its control points are modified.

A NURBS surface is a surface, widely used in CAD, defined in a 2D space with values in a 3D space: $S(u, v) \rightarrow (x, y, z)$. A NURBS surface is represented with two knot vectors and a 2-dimensional array of control points, and possibly other data depending on the CAD software used. Typically, the knot vectors are 1D arrays of floating point values. The array of control points may be indexed. Each control point is a 3D point with coordinates x, y, z. The place in the array is defined with the two indices i and j; with $0 \leq i < M$ and $0 \leq j < N$. A set of parameters known as the Gréville parameters can be computed from the knot vectors so that each value of the indices i or j can be associated to a Gréville parameter $(u_i, v_j)$. Traditionally, the Gréville parameters are a couple of means of a fixed number of consecutive values of the knot vector. This fixed number, called "degree", may be different for each dimension (u or v) of the knot vector.

In general, a couple of degrees belong to the data representing the NURBS surface. For more details, the article "Curves and surfaces for Computer Aided Geometric Design", ed. Morgan Kaufmann, (2001) by Gerald Farin provides the basics of NURBS surfaces.

Classically, a NURBS surface is defined by the following inputs.
1. A grid of (n+1) (m+1) control points $P_{ij} \in \mathbb{R}^3$ with $i \in \{0, \ldots, n\}$ and $j \in \{0, \ldots, m\}$.
2. Two positive integer numbers p,q named the "degrees" for some reasons explained later.
3. A first ordered list of real numbers $u_0 \leq \ldots \leq u_i \leq u_{i+1} \leq \ldots \leq u_{p+n+1}$ named the "u knot vector" such that the first p+1 values $u_i$ are equal and such that the last p+1 values $u_i$ are equal.
4. A second ordered list of real numbers $v_0 \leq \ldots \leq v_j \leq v_{j+1} \ldots \leq v_{q+m+1}$ named the "v knot vector" such that the first q+1 values $v_j$ are equal and such that the last q+1 values $v_j$ are equal.
5. A grid of (n+1) (m+1) weight numbers $\omega_{ij} > 0$ with $i \in \{0, \ldots, n\}$ and $j \in \{0, \ldots, m\}$.

These inputs define two B-spline basis, respectively noted $N_i^p:[u_0, u_{p+n+1}] \to \mathbb{R}^+$ with $i \in \{0, \ldots, n\}$ and $N_j^q:[v_0, v_{q+m+1}] \to \mathbb{R}^+$ with $j \in \{0, \ldots, m\}$. Basis B-spline functions $N_i^p$ and $N_j^q$ are piecewise polynomial with respective degrees p and q. Their detailed definition is not useful to the invention. The NURBS surface $S:[u_0, u_{p+n+1}] \times [v_0, v_{q+m+1}] \to \mathbb{R}^3$ is defined by the following rational parameterization.

$$S(u, v) = \frac{1}{\sum_{i=0}^{n} \sum_{j=0}^{m} \omega_{ij} N_i^p(u) N_j^q(v)} \sum_{i=0}^{n} \sum_{j=0}^{m} \omega_{ij} P_{ij} N_i^p(u) N_j^q(v)$$

Similarly, a NURBS curves $C:[t_0, t_{p+n+1}] \to \mathbb{R}^3$ is defined by a degree p a list of n+1 control points $P_i$ and weights $\omega_i$ involved in the following formula.

$$C(t) = \frac{1}{\sum_{i=0}^{n} \omega_i N_i^p(t)} \sum_{i=0}^{n} \omega_i P_i N_i^p(t)$$

In fact, from the mathematical point of view, a NURBS surface is the tensor product of two NURBS curves. For clarity, the method is mainly illustrated (on the following figures) with NURBS curves rather than NURBS surfaces.

Gréville points are now briefly discussed.

Gréville abscissas are particular values of (u,v) parameters noted $(u_k^*, v_l^*)$ with $k \in \{0, \ldots, n\}$ and $l \in \{0, \ldots, m\}$. They are uniquely defined by the following formulas.

$$u_k^* = \frac{1}{p} \sum_{\sigma=k}^{k+p-1} u_\sigma \quad v_l^* = \frac{1}{q} \sum_{\sigma=1}^{l+q-1} v_\sigma$$

Figure 5:
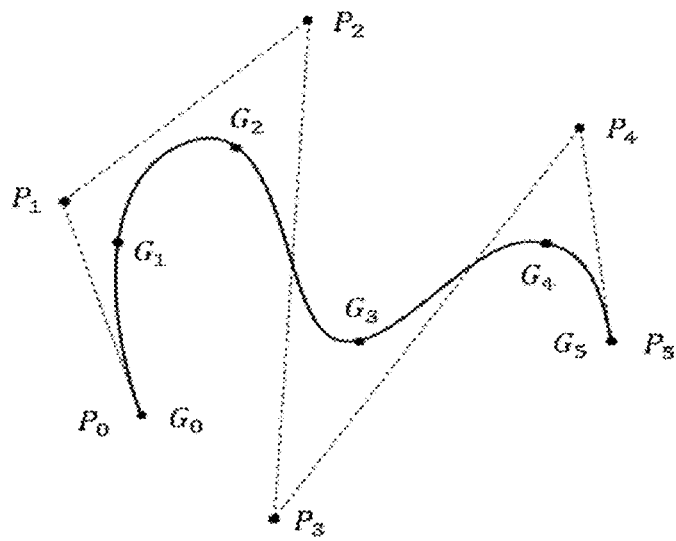
FIGS. 5-26 illustrate the method.

FIG. 5 illustrates a NURBS curve together with its n+1=6 control points $P_i$ and Gréville points $G_i$.

It is noted that the predetermined conversion algorithm may comprise refinements (e.g. ulterior processing) that locally modify or erase the NURBS structure (possibly according to a local specificity of the base mesh or to a specification added to the base mesh). These include for example smoothening of portions as in U.S. Pat. No. 7,952,575 B2, or definition of character lines as in US 2013293541 A1. Nevertheless, the surface consists in the end (for at least 90%—if not 100%—of its area) in NURBS. It is noted that the method forms itself such a refinement. It is also noted that concurrence between such refinements and the local change specification involved in the present method may be handled in any way, being merely an implementation detail. It is also noted that the implementation of the method may be performed in any way, such that the order between the refinements, and the full sequence of processing is not relevant. This is encompassed by the fact that it is said that the NURBS surface determined at S30 "corresponds" to performing a given processing. The NURBS determined at S30 may thus be submitted to such further refinement processing and still correspond to the main processing addressed in S30. In an example however, the base mesh is provided with no additional specification (other than the one of S20), i.e. the base mesh is "raw". In another example, the concurrent refinements affect the whole surface for less than 10% of its area, or even less than 5% of its area, such that there is an exact match, for the complementary area, between the result determined at S30 and the processing mentioned.

The defining S10 is performed by the user. This results in a base mesh which achieves a good trade-off between description of the surface and number of points. This is unlike mere subdivisions. The base mesh defined at S10 may be different from a mesh stemming from the mere subdivision of another mesh (e.g. according to the associated subdivision scheme). If such subdivision is invoked by the user during the design process, at least one vertex resulting from the subdivision may be manually moved (i.e. position directly—e.g. graphically, by drag-and-drop—specified by the user). All in all, starting from scratch, the defining S10 may comprise a number of subdivisions inferior to 5, or to 2. Such subdivisions allow the definition of details and thus complex design, but a base mesh is a mesh designed by a user, such that it is not too complex (relatively speaking), and such that its conversion with the above-mentioned category of conversion algorithms is relatively quick and leads to a reasonable number of NURBS control points. For example, considering the total length L of the 3D modeled object (e.g. largest length of the smallest parallelepiped bounding box enveloping the 3D modeled object), the average length of an edge of a base mesh defined at S10 by the user—to represent the 3D modeled object—may be higher than 1% of L, 5% of L or even 10% of L. These features are kept in the end of the method, which saves user-intent.

The defining S20 is now discussed.

Again, this defining S20 is performed by the user. The data inputted by the user at this point may be kept in the model as an additional specification of the 3D modeled object, which is thus at least defined by the base mesh (associated to a subdivision algorithm/surface and to a predetermined operator noted as above PCCM( ), which are predetermined to the system), and also by a 2D image and a location for engraving the 2D image on the subdivision surface. The defining S20 thus corresponds to the setting of a feature, in a feature-based CAD system, and/or the setting of a historical design operation, i.e. a node in a history tree of a history-based CAD system, such systems being known per se. The 2D image is any type of image. It may be a photograph (e.g. RGB or grayscale), or a 2D picture drawn by a user—the same user or another user (e.g. again, RGB or grayscale). Typically, the 2D represents a local detail to be engraved on the final designed and/or manufacturing object, such as a logo. The aim of the method is to perform an "engraving" design operation, which is defined by the result of the determining S30 as such and visually represents (when then displaying the surface outputted by the determining S30) a real-world engraving of the design contained in the 2D view onto the subdivision surface. However, this is internal to the system, which is predetermined to implement S30 (e.g. upon user-request/user-triggering). The user only specifies the location to which the 2D image should be applied. The user may specify such a location on the subdivision surface in any way, for example via a mere isomorphic link between the 2D image and the subdivision surface.

For example, the base mesh being associated to the subdivision surface, and the system being configured to compute an approximation thereof (thanks to operator PCCM( )), the method may comprise displaying said (approximation of) the subdivision surface. The user may then graphically define the location. For example, the user may position a 3D representation of the 2D image anywhere on (next to) the subdivision surface (the base mesh being 3D, the 2D image may be moved in a 3D workspace containing the 3D base mesh), and the size of the 2D image may potentially be increased or reduced at will, and the system may perform a predetermined projection (of the 2D image onto the surface, or of the surface onto the 2D image). The user may also specify the orientation of the 2D image. The user may also specify the projection. Any user-friendly and graphical way of performing such positioning (which may amount to projecting/sticking/applying the 2D image onto a representation of the subdivision surface) may be implemented by the method.

The location provided at S20 by the user is in any case interpreted by the system as a location on the subdivision surface, and thus impacting underlying faces of the base mesh or NURBS patches. The system may thus associate faces of the base mesh and/or NURBS patches to the location. Indeed, the predetermined conversion algorithm associates faces of the base mesh to resulting NURBS patches. Thus, when the user locates the 3D image on the subdivision surface, the user actually locates it on a subset of the NURBS patches, and therefore, a corresponding subset of base mesh faces. This association/impact retrieval may be implemented in any way. The method may be for adding small details to the subdivision surface, while saving its overall shape. First, the topology of the surface is saved. Also, more than 75% of the initial subdivision surface (i.e. the result of simply converting the base mesh), or more than 90% may be left unmodified, the size of the 2D image (e.g. after the potential expansion) being adapted for that.

The determining S30 is now discussed.

The method determines a NURBS surface which is different from the surface outputted by the predetermined mesh-to-NURBS-surface conversion algorithm (i.e. the PCCM( ) operator), which may be called "raw result" or "raw NURBS/surface". The NURBS determined at S30 is actually one that corresponds to applying a deformation map on the result of performing the mesh-to-NURBS-surface conversion algorithm to the base mesh (which is not necessarily done). Thus, the deformation map (at least conceptually) modifies the "raw result" to engrave the surface with the 2D image. For that, the deformation map includes, by definition, displacement vectors provided for positions of said raw result, and not any positions, but positions that correspond to the location for engraving the 2D image. And the displacement vectors are computed precisely based on corresponding pixel values of the 2D image, such that it is indeed the 2D image which is engraved on the subdivision surface. It is noted that the displacement vectors may be null (i.e. no displacement). Actually, the deformation map may be defined for a wider domain than the location for engraving the 2D image, e.g. the whole surface, as long as the displacement vectors are null where appropriate (notably at locations not concerned by the engraving). This is a mere matter of implementation. In short, the deformation map is a function that specifies a 3D motion of positions of the subdivision surface (and thus positions of the underlying NURBS patches, such as control points thereof, and/or positions on the faces of the base mesh)), the method implementing a predetermined association (or computation thereof, i.e. the value is predetermined, or the way of computing it is predetermined and does not depend on any further user input) between said positions and pixels of the 2D image (e.g. pixels being retained depending on a given criterion), and the method further implementing a predetermined computation of the 3D motion value based on the associated pixels. It is noted that the direction of the 3D motion (or computation thereof, i.e. the value is predetermined, or the way of computing it is predetermined and does not depend on the 2D image or any further user input, but for example only on the base mesh) may be predetermined.

The displacement vectors are computed in any way, as long as it is based on the 2D image, with the function of forming an engraving feature. The pixel values of the image are mapped to positions of the subdivision surface (thanks to the defining step S20), and thus to positions of the considered NURBS surface. In an example, the pixel values contemplated by the method are pixel grayscale values. In other words, a grayscale value associated to pixels of the 2D image is determined, and used to compute the displacement vector. The 2D image may be provided in grayscale, in which case the grayscale value may be directly the value of a pixel. The 2D image may also be provided in RGB, in which case the method may use any predetermined RGB-grayscale conversion algorithm. In both cases, the method may implement any further processing on values retained.

In an example, the amplitude (or magnitude) of a displacement vector increasingly depends on the corresponding grayscale value. In other words, the higher the (grayscale) value of a retained pixel value, the more the method modifies (in amplitude) the raw surface. Any increasing function may be implemented. In an example, the function is simply an indicator function (displacement if the value of the pixel is above a predetermined threshold, no displacement otherwise, with possibly a smoothening between "positive displacement" values and "no displacement" values in order to avoid brutal transitions). In another example, the function is a more refined function, such as a linear function.

Also, the user may further select an engraving direction from a predetermined binary list. Typically, the user projects/sticks manually the 2D image onto the surface, as explained earlier, and the user may then select if the displacement should be in the direction of projection (i.e. from the user to the surface) or in the backward direction (i.e. from the surface to the user). Alternatively, the engraving direction may be predetermined as mentioned above. These are all configurable features that increase the user-friendliness of the system.

A specific example of the method will now be discussed with reference to FIGS. 6-19.

Figure 6:
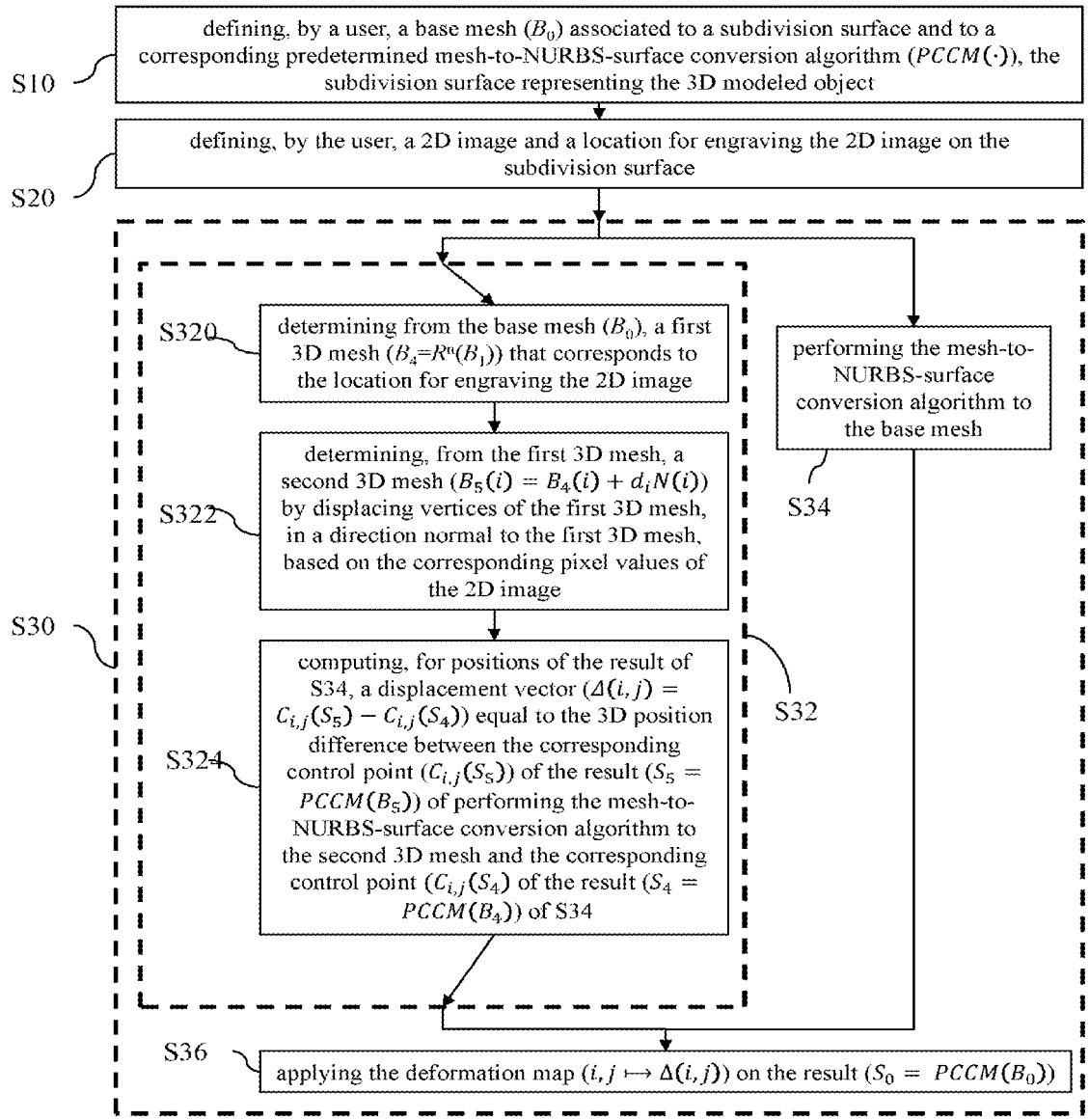

As shown on the flowchart of FIG. 6, in the example the method actually performs S30 by computing the displacement vectors (and thus the deformation map) at S32 and in parallel by performing at S34 the mesh-to-NURBS-surface conversion algorithm to the base mesh, noted $B_0$, and then the method of the example actually applies at S36 the deformation map (noted $i,j \mapsto \Delta(i,j)$) on the result (noted $S_0 = PCCM(B_0)$) of S34.

In specific, the computing S32 includes first determining S320, from $B_0$, a first 3D mesh ($B_4 = R''(B_1)$) that corresponds to the location for engraving the 2D image. The first 3D mesh, noted $B_4$, corresponds to a part of $B_0$ where the 2D image is to be engraved, according to the user specifications of S20. It may correspond to all faces of $B_0$ impacted by the defining S20 (a neighborhood related to the location defined at S20, which may be determined in any predetermined way) and may be a subdivision thereof. It is noted that a strip of non-impacted faces may optionally be also retained.

The computing S32 then includes determining S322, from $B_4$, a second 3D mesh ($B_5(i) = B_4(i) + d_i N(i)$) by displacing vertices of $B_4$, in a direction normal to the $B_4$, based on the corresponding pixel values of the 2D image. In other words, the method contemplates the part of the base mesh impacted by the engraving and displaces positions thereof according to the pixel values of the engraving image. The direction of displacement is computed in a predetermined way, as a normal direction of a mesh at vertices (any normal direction computation may be implemented). This may be done according to the above explanations, e.g. the pixel grayscale value determining linearly/proportionally/increasingly the amplitude of displacement (the direction being normal, the orientation—toward the user or backward—being user-selectable or predetermined).

There, the computing S32 may compute S324, for positions of the result of S34, a displacement vector ($\Delta(i,j) = C_{i,j}(S_5) - C_{i,j}(S_4)$) equal to the 3D position difference between the corresponding control point ($C_{i,j}(S_5)$) of the result ($S_5 = PCCM(B_5)$) of performing the mesh-to-NURBS-surface conversion algorithm to $B_5$ and the corresponding control point ($C_{i,j}(S_4)$) of the result ($S_4 = PCCM(B_4)$) of performing the mesh-to-NURBS-surface conversion algorithm to $B_4$. Here, $S_4$ and $S_5$ may be computed to perform that quickly. But any other computation implementation may be contemplated.

The specific example based on FIG. 6 performs particularly efficiently, thanks to the specific computations it performs. Moreover, this example ensures that the required continuity outputted by the PCCM( ) is preserved (a $C^2$ continuity everywhere except in the neighborhood of extraordinary vertices where it achieves at least $C^0$). Indeed, the specific algebra implemented by the example ensure this preservation, in relation with the features of the PCCM operator.

Figure 7:
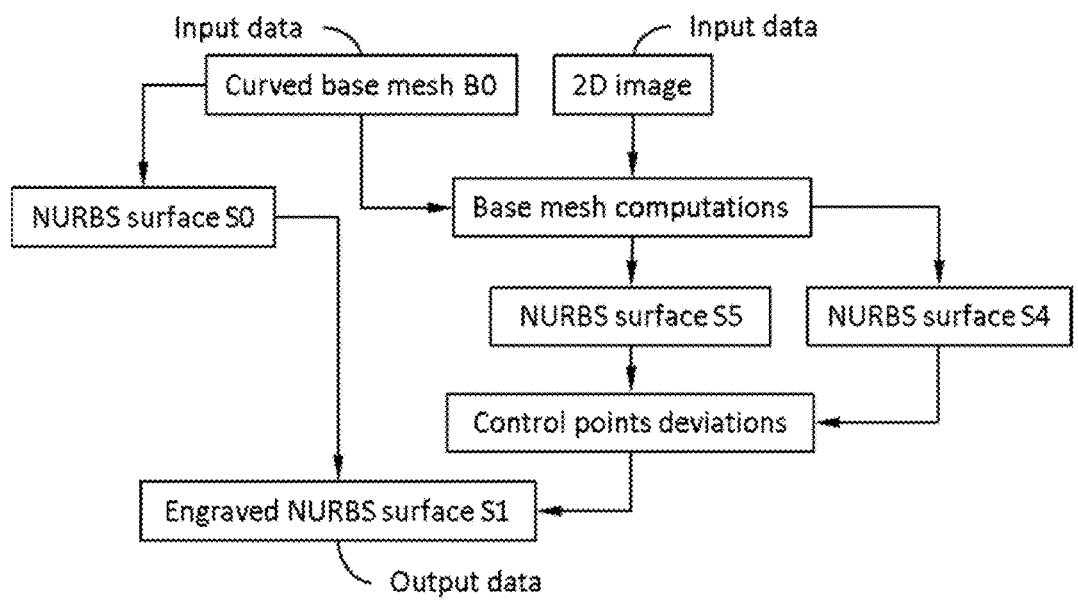

As shown on FIG. 7 which reminds the overall context, the input data are the base mesh of a subdivision surface and a 2-dimensional image. The goal is to engrave the details of the 2D image on the surface defined by the base mesh. This engraving results in a local deformation. The 2-D image is positioned with respect to the surface in order to define where the details of the image are to be located on the surface. The output data is a NURBS surface featuring the engraved image. Outside the engraved details, the overall shape of the initial surface is unchanged.

The process is as follows:
1. By using the initial base mesh $B_0$, convert the input subdivision surface into a NURBS surface $S_0$.
2. Perform base mesh computations by using the initial base mesh $B_0$ and the 2D image. This provides NURBS surfaces $S_4$ and $S_5$. Surface $S_4$ is the local unchanged shape and surface $S_5$ is the local engraved shape.
3. From NURBS surfaces $S_4$ and $S_5$, compute control points deviations.
4. Engrave the details of the 2D image by applying these control points deviations on NURBS surface $S_0$. This yields the resulting NURBS surface $S_1$.

Clearly, the method saves the best of both worlds (subdivision surface design and NURBS design), meaning that details of an image can be engraved on a subdivision surface without changing the shape outside the engraved area. This accurately captures the design.

The whole process of the example is fully automatic and can be stored as an "engraving" feature in the data structure of a history based CAD system. The inputs are the subdivision surface and the image, and the output is the engraved NURBS surface. After the engraving operation is performed, the subdivision surface can be edited or the image definition can be changed as well. The modified version of the resulting surface is obtained by replaying the engraving feature. This allows easy and fast design changes.

Despite the resulting surface is a NURBS surface, from the user point of view the functionality is that of a subdivision surface. This is because the edition is performed on the input subdivision surface. The NURBS aspect of the resulting surface is a way to handle the result that does not restrict edition capabilities.

The example is now discussed with more implementation details.

Figure 8:
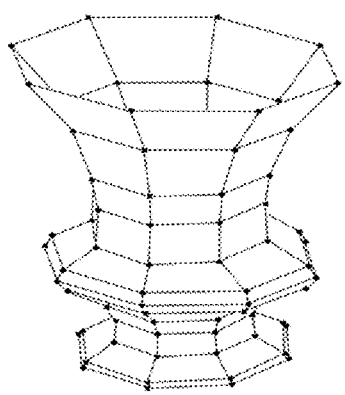
Figure 9:
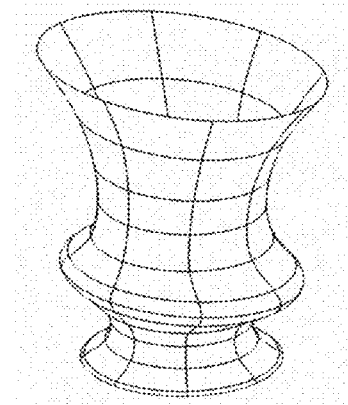

Input data and operators are detailed as follows. The subdivision surface defined by its base mesh $B_0$ is approximated by a NURBS surface $S_0$. FIG. 8 illustrates the base mesh $B_0$ of a 3D modeled object that represents a vase. FIG. 9 illustrates the NURBS surface $S_0$ (what is displayed to final users, e.g. customers).

Figure 10:
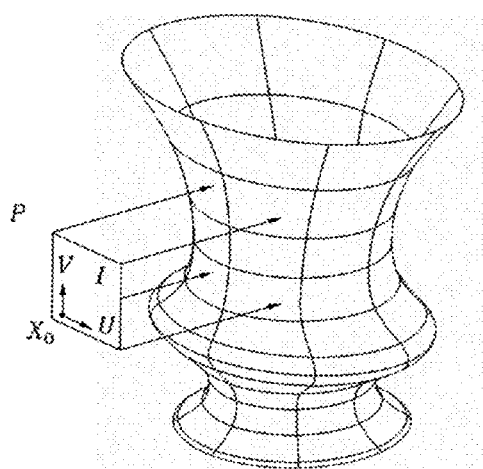

The plane including the image is noted P and its specifications are determined continuously e.g. updated) by the method. It is defined by a point $X_0$ and two perpendicular normal vectors U,V. Any point in the plane can be written $X_0 + uU + vV$, where $(u,v) \in \mathbb{R}^2$. The position of plane P defines where the image is to be engraved on surface $S_0$. The deformation map d: $\mathbb{R}^2 \to \mathbb{R}$ is defined according to the U,V vectors of plane P. It captures a grey level associated to each image point and $d(u,v) = 0$ means that there is no image detail at point (u,v). The image is included in a rectangle $I = [u_{min}, u_{max}] \times [v_{min}, v_{max}]$ meaning that $d(u,v) = 0$ outside this rectangle. FIG. 10 illustrates rectangle I on plane P and its positioning with respect to surface $S_0$. Function d may be an increasing function, this being an implementation detail to the skilled person.

The method of the example may implement a flattening operation from 3D space to plane P defined by a mapping Q: $\mathbb{R}^3 \to P$. Whether mapping Q is linear or not is not relevant. Orthogonal projection from 3D space to plane P is defined by the linear mapping H: $\mathbb{R}^3 \to P$, that is:

$$H(X) = X_0 + \langle X - X_0, U \rangle U + \langle X - X_0, V \rangle V$$

The mesh refinement of a mesh $M_i$ into a finer mesh $M_{i+1}$ is noted R, meaning that $M_{i+1} = R(M_i)$. Typically, operator R is the Catmull-Clark subdivision step. Getting the control point $P_{i,j}$ of a NURBS surface S is noted $P_{i,j} = C_{i,j}(S)$.

Figure 11:
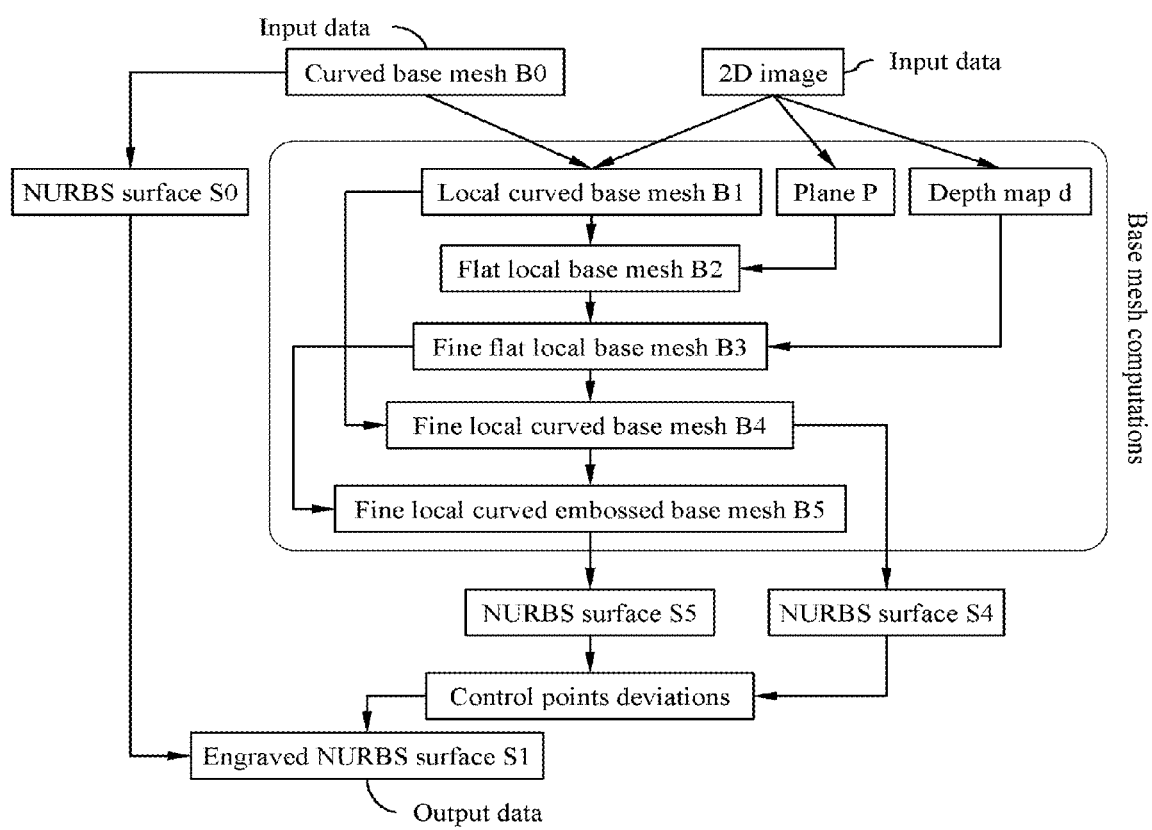

The main phase of base mesh computations is now described. The diagram of FIG. 11 illustrates the whole process, and forms a detail of the "Base mesh computations" block of the diagram of FIG. 7.

Figure 12:
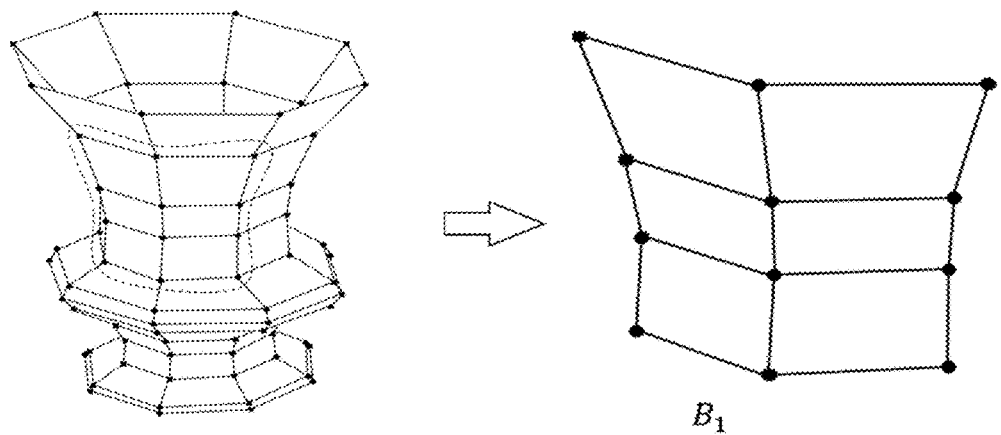

The first step is to identify the faces of $B_0$ on which the image will be engraved. Let $B_1$ be the base mesh extracted from $B_0$, as illustrated by FIG. 12.

Figure 13:
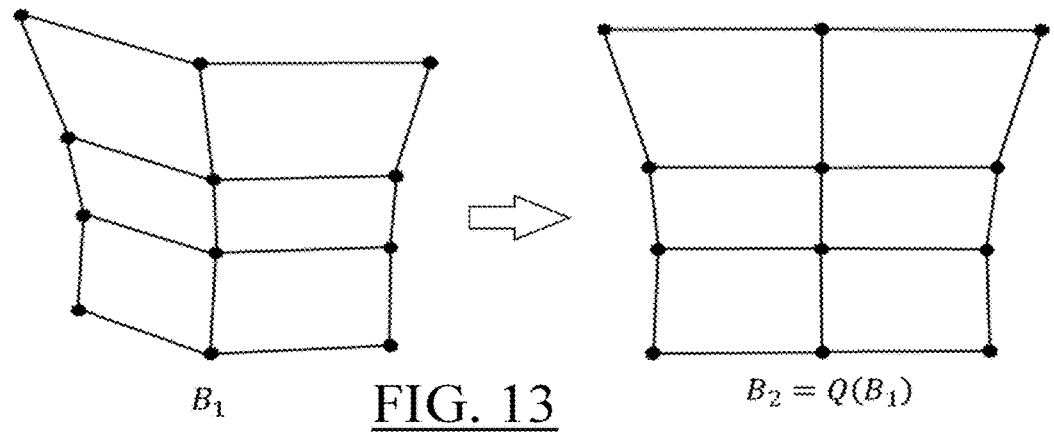

This mesh is flattened in plane P through the $B_2=Q(B_1)$ operation, yielding the flat mesh $B_2$ featuring the same topology, as illustrated by FIG. 13.

Now, the determining S310 of the first 3D mesh ($B_4$) includes not only extracting a sub-mesh $B_1$ of the base mesh that corresponds to the location for engraving the 2D image, as previously shown, but it may also include then subdividing the sub-mesh $B_1$ a predetermined number of times n, as mentioned earlier. This allows adaptation to the details of the 2D image and a more refined engraving.

The predetermined number n may be defined by the user (interactively). But it may also increasingly depend on a predetermined criterion associated to a level of details of the 2D image. In this latter case, the determination of n may be performed fully automatically, by evaluating the predetermined criterion.

An example of such automatism is provided below.

Figure 14:
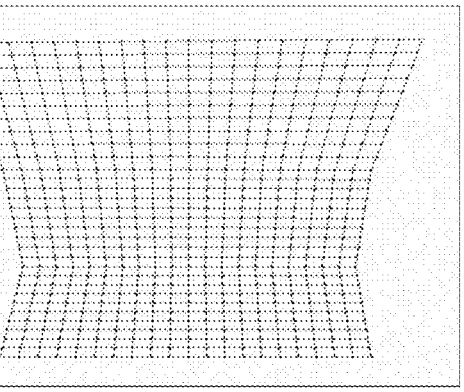
Figure 15:
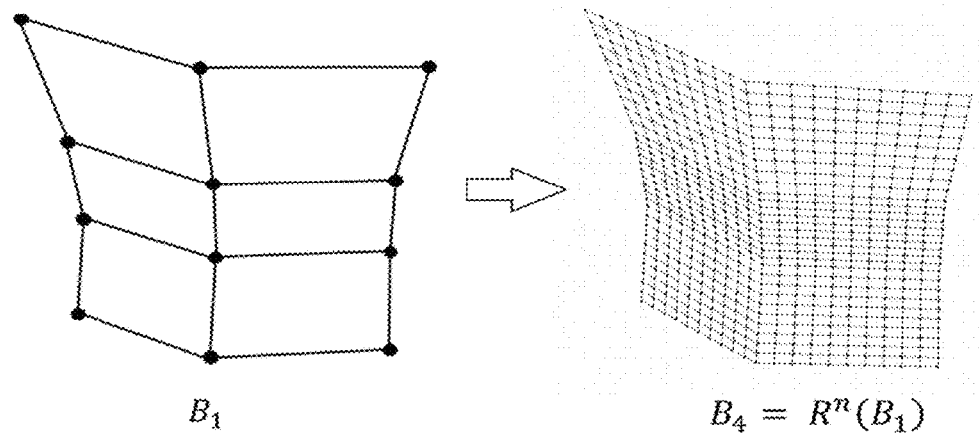

Mesh $B_2$ is to be subdivided until the mesh size is compatible with the details of the image. This yields mesh $B_3=R^n(B_2)$, where integer n is the number of subdivisions, as illustrated in FIG. 14. The same subdivision process $B_3=R^n(B_2)$ is then to be applied to the non-planar base mesh $B_1$, that is $B_4=R^n(B_1)$, as illustrated in FIG. 15. Meshes $B_4$ and $B_3$ have the same topology. Mesh $B_3$ is planar, mesh $B_4$ is non-planar.

The subdivision level n is estimated by ensuring a sufficient number of subdivision points to represent the input image, in particular in its non-null deformation areas:
- from $B_2$ it is easy to estimate the mean length between two neighbor subdivision points.
- from the input image, an erosion-like algorithm can compute the mean thickness over all the non-null deformation areas in the image space (see *The Scientist and Engineer's Guide to Digital Signal Processing*, Steven W. Smith).

n may then be first chosen so (e.g. as the minimum integer that ensures) that the ratio $$\frac{\text{Mean thickness of deformation areas}}{3*(\text{Mean distance between subdivision points})}$$

is greater than 1. This criterion is a good indicator for the user.

For each integer i, let $X_i=(x_i,y_i,z_i)$ be the 3D coordinates of the i-th point $B_3(i)$ of planar mesh $B_3$. In the local 2D axis system of plane P, the 2D coordinates of this point are $(u_i,v_i)$ with $u_i=\langle X_i-X_0,U\rangle U$ and $v_i=\langle X_i-X_0,V\rangle V$. Let $d_i=d(u_i,v_i)$ be the deformation map value at point $(u_i,v_i)$ of plane P.

Figure 16:
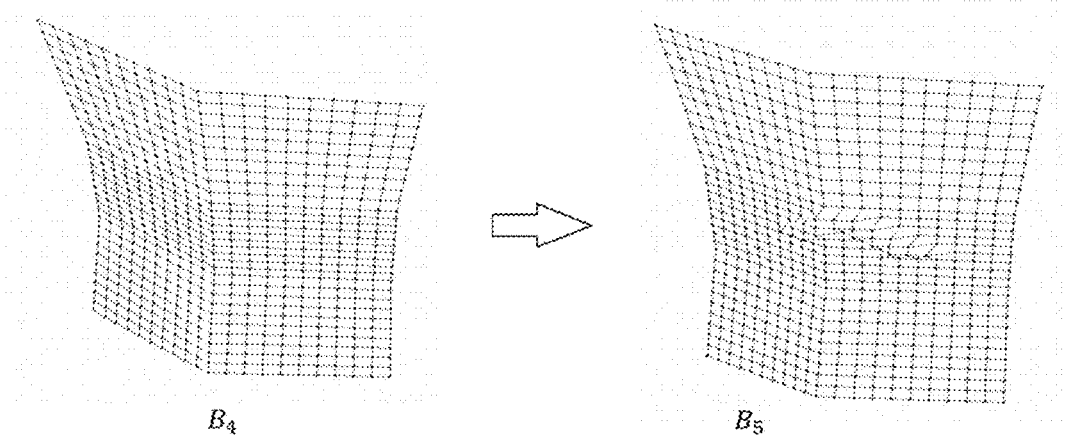
Figure 17:
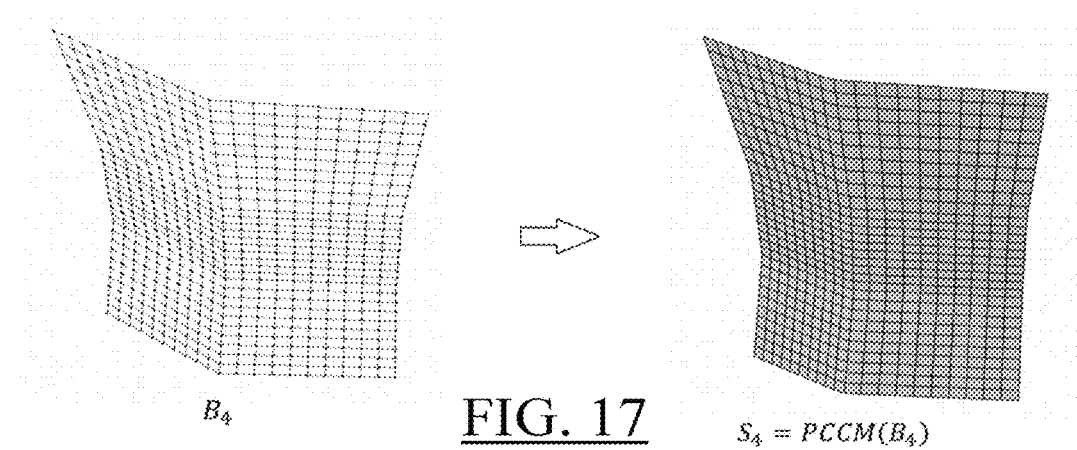
Figure 18:
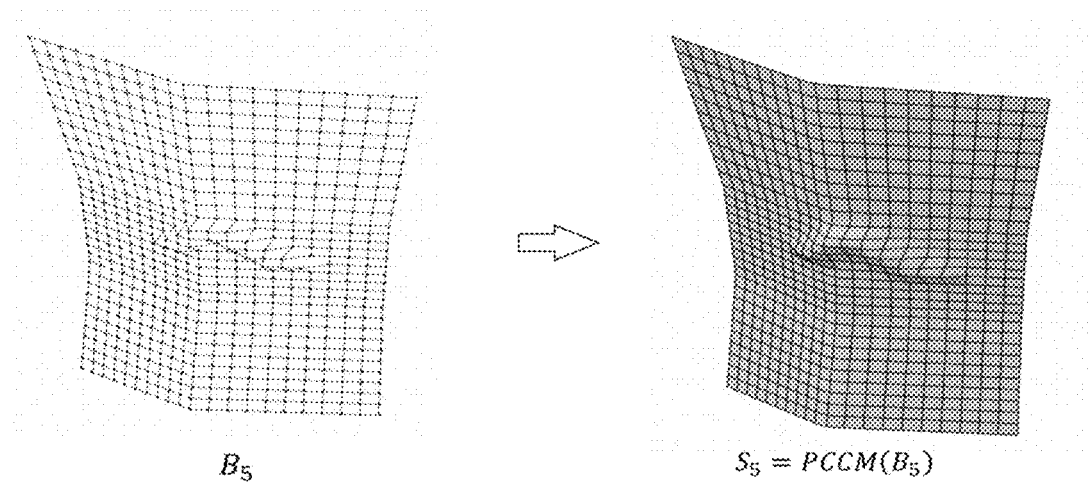

The mesh $B_4$ is now changed into another mesh $B_5$ featuring the same topology and modified as follows. For each integer i, let N(i) be the normal vector computed on mesh $R^{n-1}(B_1)$ by using neighboring points of $B_4(i)$. Vector N(i) is computed by averaging the normal around each subdivision cell at level n−1. Then, the i-th point of mesh $B_5$ is defined by $B_5(i)=B_4(i)+d_iN(i)$. This is illustrated by FIG. 16.

So far, all computations are performed on meshes. Now, it is time to translate the information in terms of control points because, in the end, a NURBS surface is the output. Let $S_4$ be the NURBS surface that approximates the subdivision surface defined by the mesh $B_4$, that is $S_4$=PCCM ($B_4$), as shown on FIG. 17. Similarly, let $S_5$ be the NURBS surface that approximates the subdivision surface defined by the mesh $B_5$, that is $S_5$=PCCM($B_5$), as shown on FIG. 18.

It must be understood that $S_5$ is not the local shape of the resulting surface. The boundaries of $S_5$ do not fit the initial surface $S_0$.

In order to report the deformation on $S_0$, a new function $\Delta$ is computed from $S_4$ and $S_5$.

By construction:
- The NURBS patches from $S_4$(resp $S_5$) are $C^2$ between each other except in the neighborhood of extraordinary vertices where they are at least $C^0$ (from PCCM(•) definition)
- Each base mesh face in the deformation area can be linked to two NURBS patches: one in $S_4$ and one in $S_5$. However these two patches do not have the same knot vectors in general and before defining $\Delta$ the vectors may be homogenized for every couple of patches by performing knot insertion or degree elevation (see "*The NURBS Book*", L. Piegl and T. Wayne, Springer, 2nd edition, 2013).

The map $i,j \mapsto \Delta(i,j)$ of control points deviations is defined by the difference of $S_5$ and $S_4$ control points: $\Delta(i,j)=C_{i,j}(S_5)-C_{i,j}(S_4)$. This deformation map is to be applied on $S_0$ only on the subset of patches of the deformation area. Here again the knot vectors of these patches are not compatible in general with the ones of $\Delta$, so they have to be homogenized too.

Once done, the deformation of the initial surface $S_0$ is obtained by applying deviations $\Delta(i,j)$ to the control points of involved NURBS surfaces, which yields the output surface $S_1$. The geometric continuity of $S_1$ is preserved by applying $\Delta$. If $\Phi$ represents the shape computed from the control points of $\Delta$ and the homogenized knot vectors of $S_0$, the patches of $\Phi$ are $C^2$ between each other except in the neighborhood of extraordinary vertices where they are at least $C^0$. Thus $S_1$ can be expressed as the linear combination: $S_1=S_0+S_5-S_4$, $S_0$, $S_4$ and $S_5$ have the same parameterization (their patches are sharing the same knot vectors), they are $C^2$ almost everywhere, so is $S_1$. As noted, the method may implemented appropriate above-mentioned homogenization (as widely known and explained in see "*The NURBS Book*", L. Piegl and T. Wayne, Springer, 2nd edition, 2013) wherever necessary.

Figure 19:
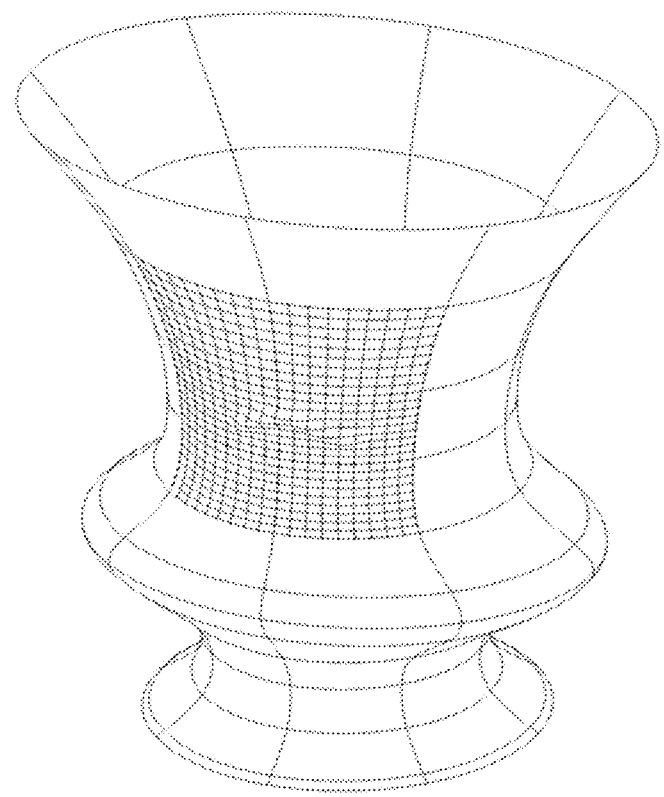

FIG. 19 shows the final result.

FIGS. 20-26 show applications of the method in real cases.

Figure 20:
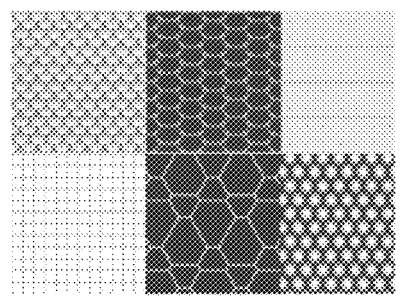
Figure 21:
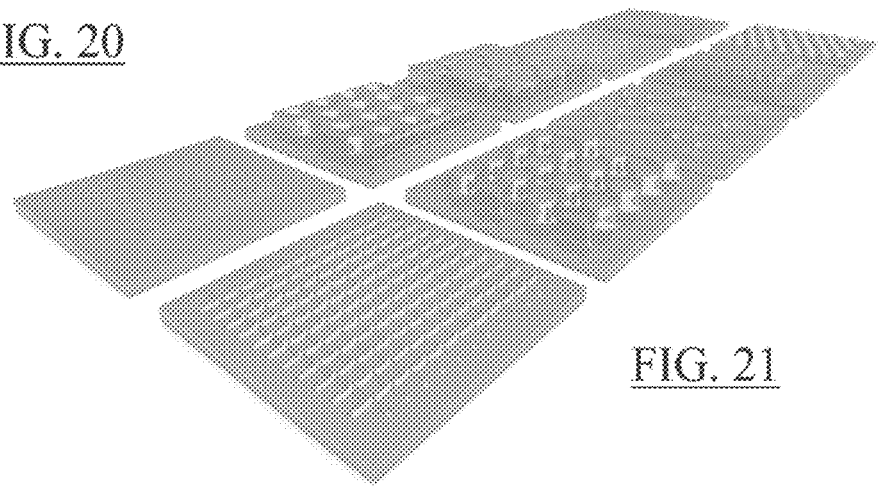
Figure 22:
Figure 23:
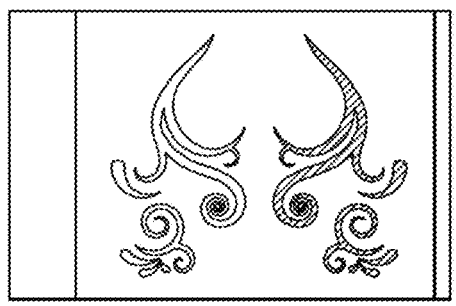
Figure 24:
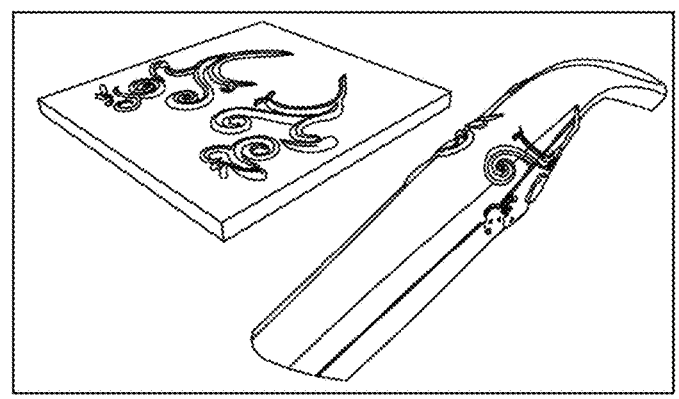
Figure 25:
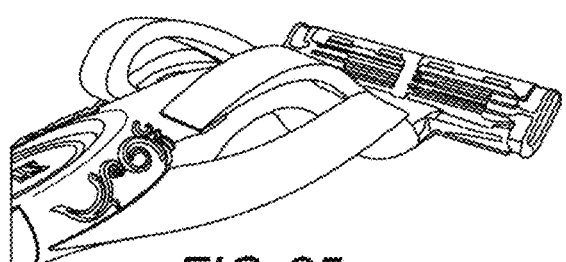
Figure 26:
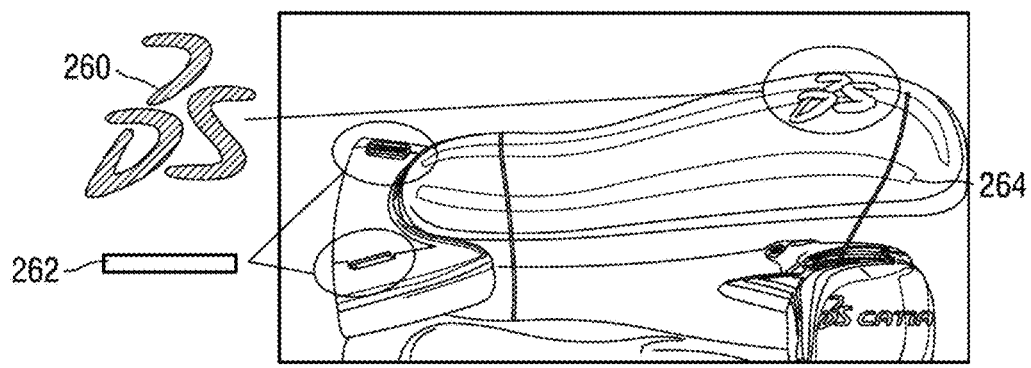

FIG. 20 shows different textures and FIG. 21 shows the result of applying such texture on a top face of parallelepiped 3D modeled object (modeled by an underlying base mesh not displayed to the user in the mode of FIG. 21, which can be in this case, very simple), thanks to the method. As can be seen, the method may be used to engrave a texture on a plane, in relief. FIG. 22 shows hairdryers with drawings engraved on their front face. FIG. 24 shows the result of engraving the pattern shown on FIG. 23 on a plane and on a razor stick. FIG. 25 shows the fully designed razor, with said pattern engraved on it. FIG. 26 shows the result of engraving logo 260 and pattern/relief 262 on a 3D modeled object 264, with the method (object 264 being, again, modeled by an underlying base mesh not displayed to the user in the mode of FIG. 21).

The invention claimed is:

1. A computer-implemented method for designing a 3D modeled object, the method comprising:
    defining, by a user, a base mesh associated to a subdivision surface and to a corresponding predetermined mesh-to-NURBS-surface conversion algorithm PCCM (•), the subdivision surface representing the 3D modeled object;

defining, by the user, a 2D image and a location for engraving the 2D image on the subdivision surface; and determining a non-uniform rational basis spline (NURBS) surface $S_1$ that corresponds to applying a deformation map $i,j \mapsto \Delta(i,j)$ on the result $S_0 = PCCM(B_0)$ of performing the mesh-to-NURBS-surface conversion algorithm to the base mesh, the deformation map including displacement vectors provided for positions of the result of performing the mesh-to-NURBS-surface conversion algorithm to the base mesh, the positions corresponding to the location for engraving the 2D image, the displacement vectors being computed based on corresponding pixel values of the 2D image, wherein the corresponding pixel values of the 2D image are pixel grayscale values, and wherein the NURBS surface is determined based on magnitudes of the pixel grayscale values.

2. The method of claim 1, wherein the method comprises computing the displacement vectors, including:

determining, from the base mesh, a first 3D mesh that corresponds to the location for engraving the 2D image;

determining, from the first 3D mesh, a second 3D mesh $B_5(i) = B_4(i) + d_i N(i)$ by displacing vertices of the first 3D mesh, in a direction normal to the first 3D mesh, based on the corresponding pixel values of the 2D image; and computing, for positions of the result of performing the mesh-to-NURBS-surface conversion algorithm to the base mesh, a displacement vector $\Delta(i,j) = c_{i,j}(S_5) - C_{i,j}(S_4)$ equal to the 3D position difference between the corresponding control point $(C_{i,j}(S_5))$ of the result $S_5 = PCCM(B_5)$ of performing the mesh-to-NURBS-surface conversion algorithm to the second 3D mesh and the corresponding control point $(C_{i,j}(S_4))$ of the result $S_4 = PCCM(B_4)$ of performing the mesh-to-NURBS-surface conversion algorithm to the first 3D mesh.

3. The method of claim 2, wherein determining the first 3D mesh includes extracting a sub-mesh of the base mesh that corresponds to the location for engraving the 2D image, and then subdividing the sub-mesh a predetermined number of times.

4. The method of claim 3, wherein the predetermined number of times is defined by the user and/or increasingly depends on a predetermined criterion associated to a level of details of the 2D image.

5. The method of claim 1, wherein the amplitude of a displacement vector increasingly depends on the corresponding grayscale value.

6. The method of claim 1, wherein the user further selects an engraving direction from a predetermined binary list.

7. A non-transitory computer readable medium storing a computer file including specifications of:

a base mesh associated to a subdivision surface and to a corresponding predetermined mesh-to-NURBS-surface conversion algorithm, the subdivision surface representing the 3D modeled object; and a 2D image and a location for engraving the 2D image on the subdivision surface, wherein the computer file being implemented by processing circuitry to define, by a user, a base mesh associated to a subdivision surface and to a corresponding predetermined mesh-to-NURBS-surface conversion algorithm, the subdivision surface representing the 3D modeled object;

define, by the user, a 2D image and a location for engraving the 2D image on the subdivision surface; and determine a non-uniform rational basis spline (NURBS) surface that corresponds to applying a deformation map on the result of performing the mesh-to-NURBS-surface conversion algorithm to the base mesh, the deformation map including displacement vectors provided for positions of the result of performing the mesh-to-NURBS-surface conversion algorithm to the base mesh, the positions corresponding to the location for engraving the 2D image, the displacement vectors being computed based on corresponding pixel values of the 2D image, wherein the corresponding pixel values of the 2D image are pixel grayscale values, and wherein the NURBS surface is determined based on magnitudes of the pixel grayscale values.

8. A non-transitory data storage medium having recorded thereon a computer program comprising instructions for performing a method for designing a 3D modeled object, the method comprising:

defining, by a user, a base mesh associated to a subdivision surface and to a corresponding predetermined mesh-to-NURBS-surface conversion algorithm, the subdivision surface representing the 3D modeled object;

defining, by the user, a 2D image and a location for engraving the 2D image on the subdivision surface; and determining a non-uniform rational basis spline (NURBS) surface that corresponds to applying a deformation map on the result of performing the mesh-to-NURBS-surface conversion algorithm to the base mesh, the deformation map including displacement vectors provided for positions of the result of performing the mesh-to-NURBS-surface conversion algorithm to the base mesh, the positions corresponding to the location for engraving the 2D image, the displacement vectors being computed based on corresponding pixel values of the 2D image, wherein the corresponding pixel values of the 2D image are pixel grayscale values, and wherein the NURBS surface is determined based on magnitudes of the pixel grayscale values.

9. A CAD system comprising a processor coupled to a GUI and to a non-transitory memory, the non-transitory memory having recorded thereon a computer program comprising instructions for performing a method for designing a 3D modeled object, the method comprising:

defining, by a user, a base mesh associated to a subdivision surface and to a corresponding predetermined mesh-to-NURBS-surface conversion algorithm, the subdivision surface representing the 3D modeled object;

defining, by the user, a 2D image and a location for engraving the 2D image on the subdivision surface; and determining a non-uniform rational basis spline (NURBS) surface that corresponds to applying a deformation map on the result of performing the mesh-to-NURBS-surface conversion algorithm to the base mesh, the deformation map including displacement vectors provided for positions of the result of performing the mesh-to-NURBS-surface conversion algorithm to the base mesh, the positions corresponding to the location for engraving the 2D image, the displacement vectors being computed based on corresponding pixel values of the 2D image, wherein the corresponding pixel values of the 2D image are pixel grayscale values, and wherein the NURBS surface is determined based on magnitudes of the pixel grayscale values.

* * * * *